United States Patent [19]

Sakamaki et al.

[11] Patent Number: 5,122,406
[45] Date of Patent: Jun. 16, 1992

[54] WEATHER STRIP

[75] Inventors: Yuji Sakamaki; Tomio Sugawara; Takahiro Usuta; Hiroshi Urume, all of Chiba, Japan

[73] Assignee: Kinugawa Rubber Industrial Co., Ltd., Chiba, Japan

[21] Appl. No.: 674,781

[22] Filed: Mar. 25, 1991

[30] Foreign Application Priority Data

Mar. 26, 1990 [JP] Japan .................................. 2-75824

[51] Int. Cl.$^5$ .............................................. E06B 7/16
[52] U.S. Cl. ..................................... 428/122; 49/490; 296/93; 428/358
[58] Field of Search ......................... 428/122, 358, 31; 49/490; 296/93

[56] References Cited

U.S. PATENT DOCUMENTS 4,848,035 7/1989 Sakuma et al. ...................... 49/491
4,952,442 8/1990 Warner ............................ 428/122 X

FOREIGN PATENT DOCUMENTS 0117747 9/1984 European Pat. Off. .
58-149837 9/1983 Japan ................... 428/122
2173845 10/1986 United Kingdom ................ 428/122

Primary Examiner—Henry F. Epstein
Attorney, Agent, or Firm—Bachman & LaPointe

[57] ABSTRACT

A weather strip for sealingly closing a space having an opening edge associated with a cover member. The weather strip comprises a plurality of extruded weather strip segments each having a welt portion sealingly fitted on the opening edge and a hollow sealing portion formed integrally on the welt portion for sealing contact with the cover member. The hollow sealing portion has a flexible wall defining therein a central bore. The flexible wall has vent holes opening into the exterior of the space to communicate the central bore with the exterior of the space. The weather strip also includes at least one joint segment connected between adjacent two of the weather strip segments. The joint segment includes a chamber connected between the central bores of the adjacent weather strip segments and a passage connected to the chamber for discharging water from the central bore to the exterior of the space at the lower end.

5 Claims, 3 Drawing Sheets

WEATHER STRIP

BACKGROUND OF THE INVENTION

This invention relates to a weather strip for sealingly closing a space having an opening edge associated with a cover member. Although the invention will be described in connection with a weather strip associated with a vehicle trunk lid, it is to be understood that the invention is not limited in any way to this application.

With reference to FIGS. 1 and 2, a weather strip on which the invention is an improvement is briefly described in order to provide a basis for a better understanding of the difficulties attendant thereon.

The weather strip, generally designated by the numeral 10, is associated with a vehicle trunk lid A for sealingly closing the vehicle trunk room defined by a vehicle body panel B having an opening edge or flange C. The weather strip 10 has a welt portion 12 fitted on the flange C and a hollow sealing portion 14 formed integrally on the welt portion 12 for sealing contact with the trunk lid A. The welt portion 12 is made of a hard rubber and the hollow sealing portion 14 is made of a soft rubber. The hollow sealing portion 14 has a flexible wall defining a central bore therein. The flexible wall has a number of vent holes 16 to permit deformation of the hollow sealing portion 14 with movement of the trunk lid A. The vent holes 16 opens into the trunk room in order to prevent entry of rainwater into the trunk room, as best shown in FIG. 2.

However, such a weather strip structure fails to provide smooth deformation of the hollow sealing member 14 when the trunk lid A closes. This stems mainly from the fact that air cannot be discharged smoothly from the center bore into the closed trunk room. As a result, the trunk lid A cannot be closed smoothly.

SUMMARY OF THE INVENTION

It is a main object of the invention to provide an improved weather strip which permits smooth closing of a cover member associated therewith.

There is provided, in accordance with the invention, a weather strip for sealingly closing a space having an opening edge associated with a cover member. The weather strip comprises a plurality of extruded weather strip segments each having a welt portion sealingly fitted on the opening edge and a hollow sealing portion formed integrally on the welt portion for sealing contact with the cover member. The hollow sealing portion has a flexible wall defining therein a central bore. The flexible wall has vent holes opening into the exterior of the space to communicate the central bore with the exterior of the space. The weather strip also includes at least one joint segment connected between adjacent two of the weather strip segments. The joint segment includes a chamber connected between the central bores of the adjacent weather strip segments and a passage connected to the chamber for discharging water from the central bore to the exterior of the space.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
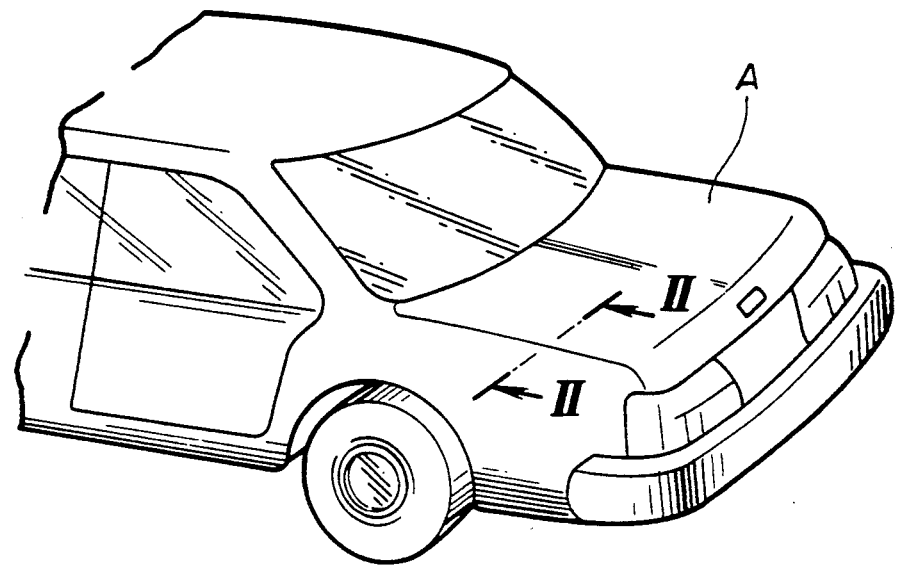
FIG. 1 is a perspective view showing an automotive vehicle to which the invention is applicable.
Figure 2:
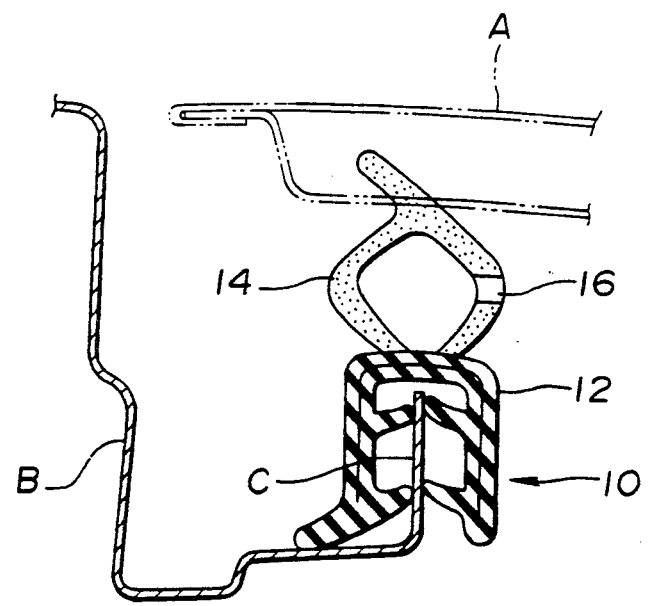
FIG. 2 is a sectional view showing a weather strip on which the invention is an improvement.
Figure 3:
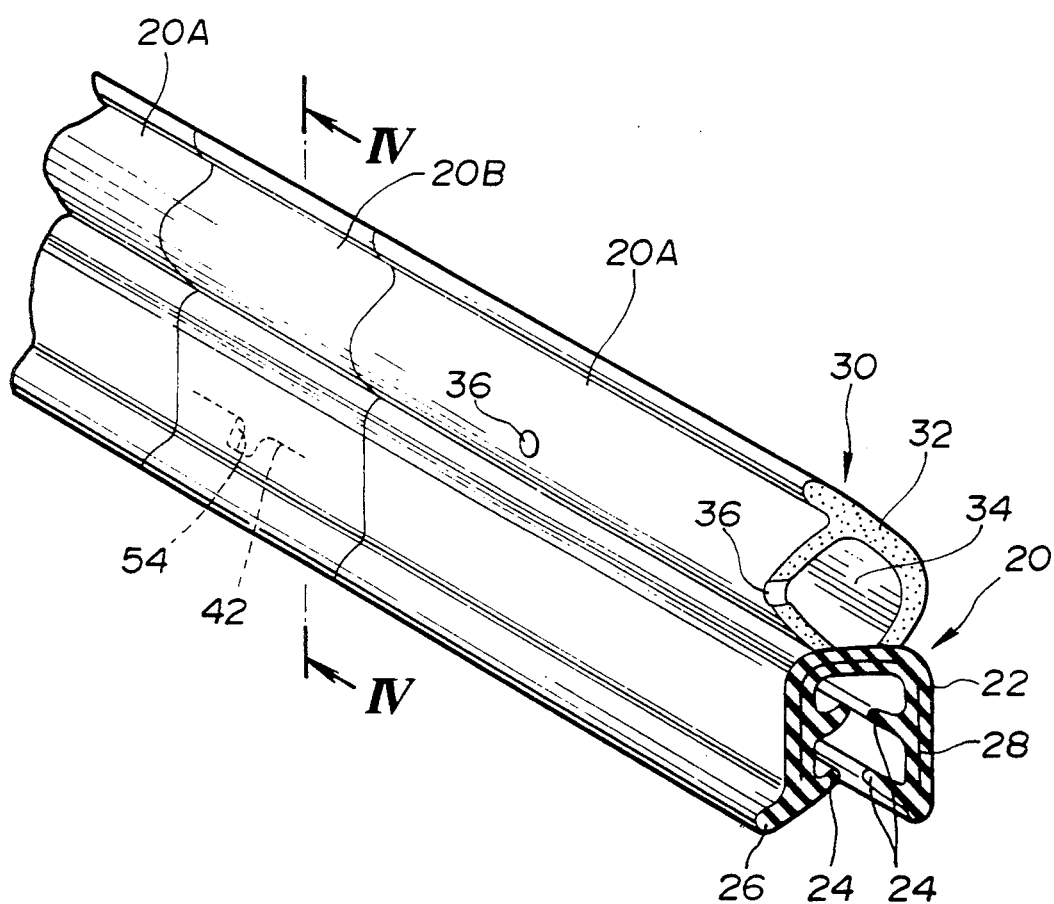
FIG. 3 is a perspective view in section showing one embodiment of a weather strip made in accordance with the invention.
Figure 4:
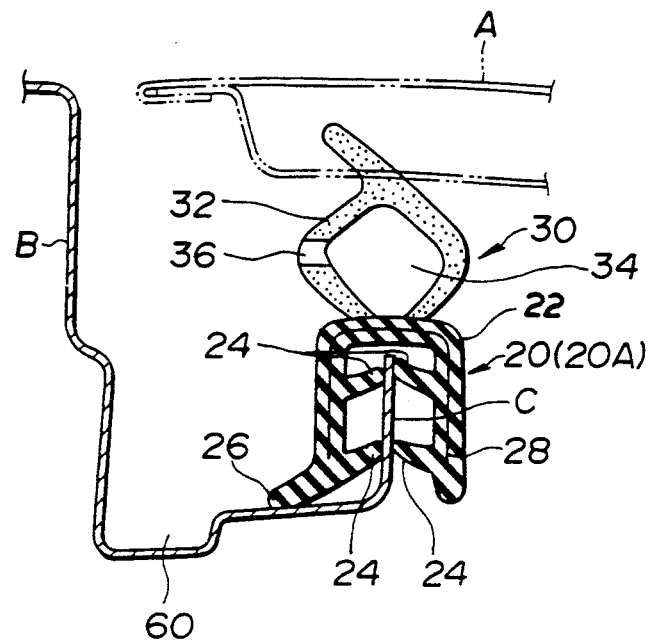
FIG. 4 is a sectional view showing the weather strip segment of the weather strip of FIG. 3.
Figure 5:
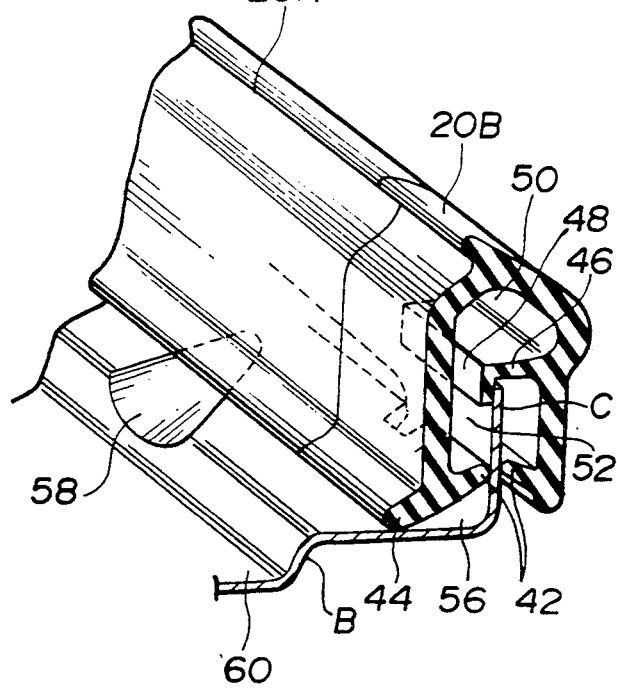
FIG. 5 is sectional view showing the joint segment of the weather strip of FIG. 3.

Referring to FIGS. 3 to 5, there is shown one embodiment of a weather strip structure made in accordance with the invention. The weather strip, generally designated by the numeral 20, is composed of a plurality of extruded weather strip segments 20A adjacent two of which are joined through a joint segment 20B, as best shown in FIG. 3. The join segment 20B is formed by injecting a hard rubber material into a mod which receives the ends of the adjacent weather strip segments 20A on the opposite sides thereof.

As shown in FIG, 4, each of the weather strip segments 20A has a welt portion 22 fitted on the flange (opening edge) C, and a hollow sealing portion 30 formed integrally on the top of the welt portion 22 for sealing contact with the trunk lid A when the trunk lid A is closed. The welt portion 22 is made of hard rubber and the hollow sealing portion 30 is made of sponge rubber. The welt portion 22 has an inverted U shaped cross section. The welt porion 22 has two pairs of inner lips 24 extending inwardly into resilient gripping contact with the flange C and an outer lip 26 extending outwardly into sealing contact with the vehicle body panel B. The welt portion 22 has a reinforcement metal member 28.

The hollow sealing portion 30 includes a flexible wall 32 having circular or rhombic cross section defining a central bore 34 therein. The flexible wall 32 is formed with vent holes 36 opening into the exterior of the trunk room to communicate the central bore 34 with the exterior of the trunk room.

As shown in FIG. 5, the joint segment 20B has a cross section generally conforming to the cross section of the weather strip segments 20A. The joint segment 20B has a pair of inner lips 42 extending inwardly into resilient gripping contact with the flange G and an outer lip 44 extending outwardly into sealing contact with the vehicle body panel B. The joint segment 20B also has an inner guide lip 46 having an L-shaped cross section. The inner guide lip 46 extends inwardly and terminates in a flange 48 engaging with the flange C to define a chamber 50 above the inner guide lip 41 and a passage 52 connected to the chamber 50 on one side of the flange C remote from the trunk room. The chamber 50 is connected to the central bores 34 of the hollow sealing portions 30 of the adjacent weather strip segments 20A. One of the inner lips 42 remote from the trunk room is formed with a cutout 54 through which the passage 52 communicates with the space 56 defined between the vehicle body panel B and the inner and outer lips 42 and 44 for discharging water from the central bores 34 into the space 56. The space 56 is connected to a drip portion 60 through a port or depressed portion 58 formed in the vehicle body panel B. Thus, the water introduced through the vent holes 36 into the central bore 34 is discharged to the drip portion 60 through the chamber 50, the passage 52, the cutout 54, the space and the port 58.

According to the invention, the hollow sealing portion 30 has vent holes 36 opening to the exterior of the trunk room. This permits smooth deformation of the hollow sealing portion 30 and smooth closing of the trunk lid. Even when rainwater is introduced through the vent holes 36 into the central bore 34, it is discharged with high efficiency to the drip portion 60 formed in the vehicle body panel B.

What is claimed is:

1. A weather strip for sealingly closing a space having an opening edge associated with a cover member, comprising:

a plurality of extruded weather strip segments each having a welt portion sealingly fitted on the opening edge and a hollow sealing portion formed integrally on the welt portion for sealing contact with the cover member, the hollow sealing portion having a flexible wall defining therein a central bore, the flexible wall having vent holes opening into the exterior of the space to communicate the central bore with the exterior of the space;

at least one joint segment connected between adjacent two of the weather strip segments, the joint segment including a chamber connected between the central bores of the adjacent weather strip segments and a passage connected to the chamber for discharging water from the central bore to the exterior of the space.

2. A weather strip according to claim 1 wherein the joint segment has a cross-section generally conforming to the cross-section of the adjacent weather strip segments.

3. A weather strip according to claim 2 wherein the joint segment includes an inner lip defining said chamber.

4. A weather strip according to claim 3 including a body panel adjacent the cover member and a space between the body panel and joint segment communicating with said passage.

5. A weather strip according to claim 3 wherein said inner lip is a guide lip which terminates in a flange engaging said opening edge.

* * * * *